Figure 1:
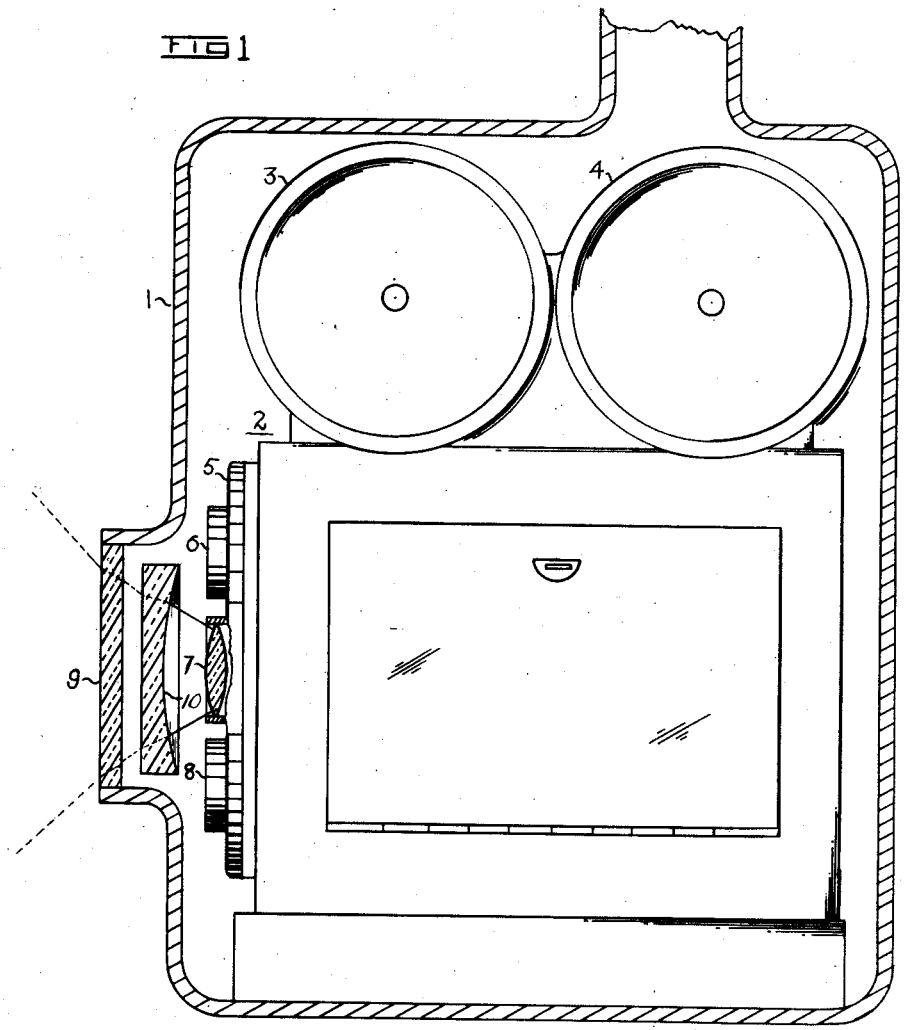

May 14, 1935. F. W. JACKMAN 2,001,683
SUBMARINE CAMERA
Filed Aug. 26, 1932

INVENTOR:
FRED W. JACKMAN.
BY W E Beatty
ATTORNEY.

Patented May 14, 1935

2,001,683

UNITED STATES PATENT OFFICE 2,001,683

SUBMARINE CAMERA

Fred W. Jackman, Beverly Hills, Calif., assignor to Warner Bros. Pictures, Inc., New York, N. Y., a corporation of Delaware Application August 26, 1932, Serial No. 630,568

2 Claims. (Cl. 88—16)

This invention relates to the art of photography and has to do with the making of submarine motion pictures.

It has heretofore been proposed to take submarine motion pictures by using various types of underwater camera equipment, such as a special camera built in an elongated barrel or a submersible casing containing standard equipment. In each of these cases an ordinary objective lens has been used to photograph the under-water scenes, either directly or through an optical glass window mounted on the side wall of the supporting structure.

As is well understood, water has a definite magnification value, whereby an object that in air would photograph perfectly at a certain distance from a camera lens, will appear far too large for the field of view of the same lens and at the same distance therefrom when under water. Thus, it will be seen that to photograph under-water scenes, the object to be photographed must, at all times, be at a distance from the camera lens relatively greater than is necessary for photographing the same object in air, in order to keep that object within the field of view of the camera.

The main disadvantages under these circumstances are that due to diffusion there is an increasing loss of photographic light value the farther away from the camera that the object to be photographed is taken; also it is exceedingly difficult to follow with a viewfinder a moving object at a distance under water, for the same reason.

In order to overcome these difficulties, so that motion pictures may be taken under water at a distance from the lens of a camera comparable with the distance necessary to photograph the same object in air, the present invention optically compensates for the magnification of the water in which the camera is submerged whereby the magnified image of a submerged object to be photographed is reduced in size. To this end, the present invention provides a reducing glass or plano concave spherical condenser lens between the objective lens of a motion picture camera and the object to be photographed under water. This reducing glass has the effect of a wide-angle lens, whereby the magnification of the water is overcome and an object may be kept in the field of view of the motion picture camera, even though it is close to the camera.

Thus, by using the present invention an under-water swimmer may swim close to the camera and easily keep within the field of view thereof, whereas using an ordinary objective lens he would have to swim at such a distance from the camera that the camera would appear as a blur to him and he would have great difficulty in seeing the objective for the purpose of staying in the field of view. Also an enormous gain is made in the amount of light on the swimmer by using the present invention whereby he may remain close to the camera.

The details of this invention will be apparent from the following description when read in conjunction with the accompanying drawing, wherein Figure 1 is a side elevation, partly in cross section, of the invention.

The invention will be described in connection with a submarine camera casing 1 of the type disclosed and claimed in the co-pending application, Ser. No. 620,825, filed July 5, 1932, by Fred W. Jackman, although the invention is applicable to any other type of submersible motion picture camera casing. As shown in the drawing an ordinary motion picture camera 2 is provided with its film supply and take-up reels 3 and 4, a lens turret 5 and the usual lenses 6, 7 and 8. The lens 7 in this case is a 25 millimeter objective lens.

Positioned before the lens 7 is an optical glass window 9 mounted in the side of casing 1.

The invention provides a spherical plano concave condenser lens or reducing glass 10, which is movably mounted by any suitable means between the glass window 9 and the objective lens 7 so that the concavity of the lens 10 is opposite to the front convex face of the lens 7.

The lens 10 functions as a wide-angle lens and serves to overcome the magnification of an object in water whereby the magnified image of a submerged object to be photographed is reduced in size so that the object may be close to the camera, and still be in the field of view thereof.

Having thus described the invention what is claimed as new and desired to secure by Letters Patent is:

1. A submarine camera comprising a submersible water-tight casing, a camera therefor, an objective lens in said camera, a window in said casing in front of said lens, a reducing lens adjacent said objective lens and located between said objective lens and said window, the reducing power of said reducing lens being so related to the magnifying power of the water in which said camera is submerged that distant submerged objects photographed by said camera appear to have a size comparable with the size they would have in air if positioned at the same distance from the camera.

2. A submarine motion picture camera comprising a submersible water-tight casing, a camera with its supply and take-up reels therefor, an objective lens in said camera, a window in said casing in front of said lens, a plano concave reducing lens having its concave face adjacent said objective lens and located between said objective lens and said window, the reducing power of said reducing lens being so related to the magnifying power of the water in which said camera is submerged that distant submerged objects photographed by said camera appear to have a size comparable with the size they would have in air if positioned at the same distance from the camera.

FRED W. JACKMAN.